(12) United States Patent
McVicar

(10) Patent No.: US 6,925,898 B2
(45) Date of Patent: Aug. 9, 2005

(54) VARIABLE SENSOR SHAFT RETENTION APPARATUS

(75) Inventor: David McVicar, El Dorado, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 330 days.

(21) Appl. No.: 10/274,731

(22) Filed: Oct. 18, 2002

(65) Prior Publication Data

US 2004/0074324 A1 Apr. 22, 2004

(51) Int. Cl.[7] .............................................. G01D 21/00
(52) U.S. Cl. ..................................................... 73/866.5
(58) Field of Search ................................ 73/866.5, 493, 73/494; 324/207.25, 167; 403/6, 7, 292, 297, 348; 464/184; 285/399, 401

(56) References Cited

U.S. PATENT DOCUMENTS

| | | | | |
|---|---|---|---|---|
| 1,730,633 A | * | 10/1929 | Simonds | 464/184 |
| 2,990,189 A | * | 6/1961 | Beers | 279/97 |
| 5,149,149 A | * | 9/1992 | Wu | 285/402 |
| 5,675,250 A | * | 10/1997 | Berglund et al. | 324/207.25 |

* cited by examiner

Primary Examiner—Robert Raevis
(74) Attorney, Agent, or Firm—Townsend and Townsend and Crew LLP

(57) ABSTRACT

Embodiments of the present invention are directed to providing secure retention of the variable sensor and the rotational object to which it is attached for measuring rotation thereof. In one embodiment, a sensor retention apparatus comprises a rotational sensor including a sensor shaft which has a direction of insertion. The sensor shaft includes a retainer slot oriented nonparallel to the direction of insertion and extending from a first surface of the body through the sensor shaft to a second surface of the sensor shaft. A rotational member has a cavity shaped to receive the sensor shaft along the direction of insertion. The rotational member includes an interference slot disposed adjacent the cavity. A retainer member is configured to be inserted into the retainer slot of the sensor shaft of the rotational sensor and to include a protruded portion protruding from the second surface of the retainer slot into the interference slot of the rotational member. The protruded portion is deformed to form an interference contact with the interference slot of the rotational member.

22 Claims, 3 Drawing Sheets

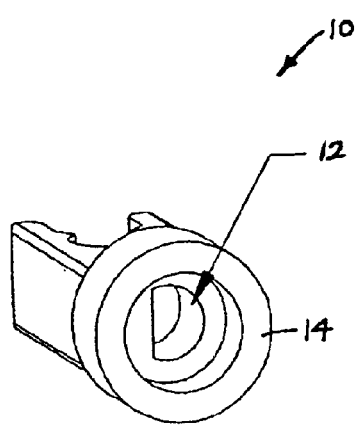
FIG. 1 (PRIOR ART)
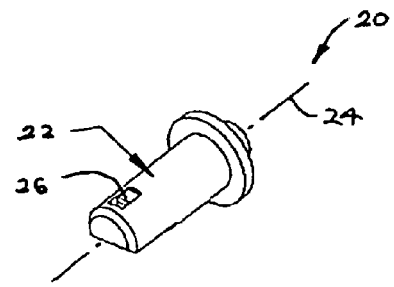
FIG. 2A
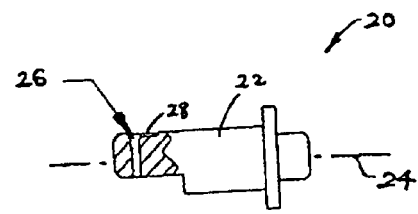
FIG. 2B
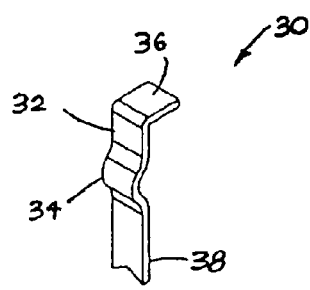
FIG. 3A
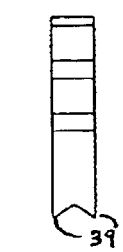 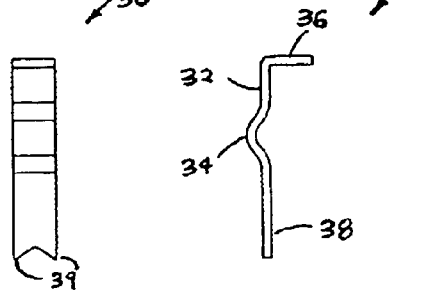
FIG. 3C   FIG. 3B
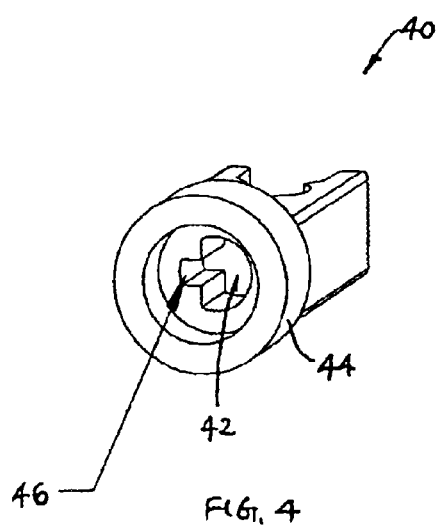
FIG. 4

VARIABLE SENSOR SHAFT RETENTION APPARATUS

BACKGROUND OF THE INVENTION

This invention relates generally to devices and methods for measuring the position of an object and, more particularly, to devices and methods of connecting a variable sensor to a rotational object. The present invention is applicable to a variety of endeavors such as computer gaming and robotic control.

Variable sensors are used to provide rotation measurements of many different devices, including those that sustain impacts, such as joystick gimbals, shifter paddles, steering wheels, brake and accelerator pedal assemblies, and the like. Attachment of the variable sensor is typically made by interference fit to a D-shaped cavity in the rotational object. The D-shaped cavity is typically provided in a rotational shaft of the object. The flat portion of the D-shaped cavity prevents relative movement in rotation between the variable sensor and the rotational object on which rotation is being measured. A poor fit between the variable sensor and the rotational object may cause detachment of the variable sensor from the rotational object, rendering the measurement apparatus nonfunctional. Vibration or movement of the rotational object may also result in detachment of the variable sensor from the rotational object. One way to secure the variable sensor in place employs external ribbing or other structures. Such an approach, however, causes nonrotational forces between the variable sensor and the rotational object, thereby reducing the life and the quality of output of the variable sensor.

BRIEF SUMMARY OF THE INVENTION

Embodiments of the present invention are directed to providing secure retention of the variable sensor and the rotational object to which it is attached. A retainer member is used to form an interference contact with both the sensor and the rotational object to provide an improved fit between them and to prevent them from being separated due to vibration or movement of the components.

In accordance with an aspect of the present invention, a sensor retention apparatus comprises a rotational sensor including a sensor shaft which has a direction of insertion. The sensor shaft includes a retainer slot oriented nonparallel to the direction of insertion and extending from a first surface of the body through the sensor shaft to a second surface of the sensor shaft. A rotational member has a cavity shaped to receive the sensor shaft along the direction of insertion. The rotational member includes an interference slot disposed adjacent the cavity. A retainer member is configured to be inserted into the retainer slot of the sensor shaft of the rotational sensor and to include a protruded portion protruding from the second surface of the retainer slot into the interference slot of the rotational member. The protruded portion is deformed to form an interference contact with the interference slot of the rotational member.

In some embodiments, the retainer slot is oriented substantially perpendicular to the direction of insertion of the sensor shaft. The protruded portion of the retainer member is bent during insertion of the rotational sensor into the rotational member to form the interference contact with the interference slot of the rotational member. The retainer member may comprise a strip. The protruded portion of the retainer member may comprise a resilient material which is deformed to form a resilient interference contact with the interference slot of the rotational member.

In accordance with another aspect of the present invention, a sensor retention apparatus comprises a rotational sensor including a sensor shaft which extends along a longitudinal axis. The sensor shaft includes a retainer slot oriented nonparallel to the longitudinal axis and extending from a first surface of the body through the sensor shaft to a second surface of the sensor shaft. A rotational member has a cavity shaped to receive the sensor shaft. The rotational member includes an interference slot which is disposed adjacent the cavity and extends generally along the longitudinal axis of the sensor shaft received into the cavity. A mechanism is disposed in the retainer slot of the sensor shaft and the interference slot of the rotational member for forming an interference contact with the retainer slot of the sensor shaft and the interference slot of the rotational member.

In some embodiments, the cavity of the rotational member has a D-shaped cross-section having a curved portion and a flat portion, and the interference slot is disposed adjacent the flat portion of the D-shaped cavity. The sensor shaft has a D-shaped cross-section having a curved portion and a flat portion. The sensor shaft is configured to form an interference fit with the cavity of the rotational member, and the retainer slot extends from the curved portion to the flat portion of the D-shaped sensor shaft.

In accordance with another aspect of the invention, a sensor retention method comprises providing a rotational sensor including a sensor shaft which has a direction of insertion. The sensor shaft includes a retainer slot oriented nonparallel to the direction of insertion and extending from a first surface of the body through the sensor shaft to a second surface of the sensor shaft. A rotational member has a cavity shaped to receive the sensor shaft along the direction of insertion. The rotational member includes an interference slot disposed adjacent the cavity. A retainer member is inserted into the retainer slot of the sensor shaft of the rotational sensor to provide a protruded portion of the retainer member through the second surface of the retainer slot. The sensor shaft of the rotational sensor is inserted into the cavity of the rotational member along the direction of insertion to deform the protruded portion of the retainer member to form an interference contact with the interference slot of the rotational member.

In some embodiments, the sensor shaft of the rotational sensor is inserted into the cavity of the rotational member along the direction of insertion to bend the protruded portion of the retainer member to form an interference contact between an edge of the protruded portion and a wall of the interference slot of the rotational member. The sensor shaft of the rotational sensor is inserted into the cavity of the rotational member along the direction of insertion to form an interference fit with the cavity of the rotational member.

In accordance with another aspect of this invention, a sensor retention apparatus comprises a rotational member having a cavity and an interference slot disposed adjacent the cavity. A rotational sensor includes a sensor shaft which is shaped to be inserted into the cavity of the rotational member along a direction of insertion. The sensor shaft includes a retainer member. The retainer member has a protruded portion protruding from the sensor shaft into the interference slot of the rotational member in a direction which is nonparallel to the direction of insertion. The protruded portion is deformed to form an interference contact with the interference slot of the rotational member.

BRIEF DESCRIPTION OF THE DRAWINGS

FIG. 1 is a perspective view of a typical rotational object;

FIG. 2A is a perspective view of a variable sensor having a retainer slot according to an embodiment of the present invention;

FIG. 2B is a partial cross-sectional view of the variable sensor of FIG. 2A;

FIG. 3A is a perspective view of a retainer member according to an embodiment of the present invention;

FIG. 3B is a front elevational view of the retainer member of FIG. 3A;

FIG. 3C is a side elevational view of the retainer member of FIG. 3A;

FIG. 4 is a perspective view of a rotational object having an interference slot according to an embodiment of the present invention;

DETAILED DESCRIPTION OF THE INVENTION

Figure 5:
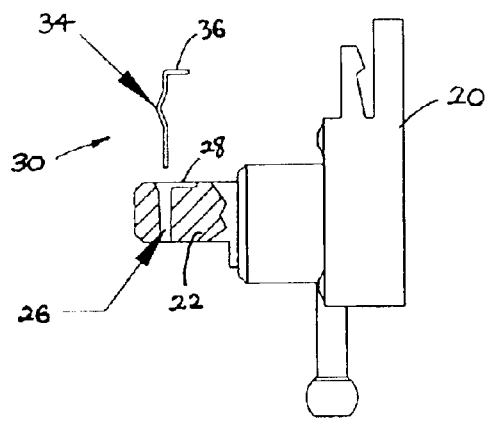
FIG. 5 is an exploded elevational view of the variable sensor of FIG. 2A and the retainer member of FIG. 3A.

FIG. 1 shows a typical rotational object 10 having a D-shaped cavity 12 formed in a rotational shaft 14. The rotational object 10 may be connected to an input device (e.g., a joystick) or the like and is rotated during operation. A variable sensor having a D-shaped sensor shaft is pressed into the D-shaped cavity 12 of the rotational shaft 14 to measure the rotation of the object 10.

FIGS. 2A and 2B illustrate a variable sensor 20 having a D-shaped sensor shaft 22 that may be inserted into the D-shaped cavity of the rotational object 10 along a direction of insertion to measure the rotation of the rotational shaft 14. The direction of insertion is parallel to the longitudinal axis 24 of the sensor shaft 22 in the embodiment shown. The variable sensor 20 includes an additional feature in the form of a retainer slot 26. The retainer slot 26 is oriented nonparallel to the direction of insertion 24 and extends through the sensor shaft 22 between two surfaces of the sensor shaft 22. In the specific embodiment shown, the retainer slot 26 is generally perpendicular to the direction of insertion 24 of the sensor shaft 22. The retainer slot 26 extends between two opposite surfaces of the sensor shaft 22. FIGS. 2A and 2B shows the retainer slot 26 extending between the curved surface and the flat surface of the D-shaped sensor shaft 22. In other embodiments, the retainer slot 26 may extend between opposite sides of the curved surface. The retainer slot 26 may include a slot extension 28 along a surface of the sensor shaft 22 (the curved surface in the embodiment shown).

The retainer slot 26 of the sensor shaft 22 is provided to receive a retainer member 30, an embodiment of which is illustrated in FIGS. 3A–3C. In the specific embodiment, the retainer member 30 is a retainer strip which is shaped to provide a secure retention between the sensor shaft 22 of the variable sensor 20 and a rotational object. The retainer member 30 includes a main body or main portion 32 having a bump 34. A retainer end portion 36 is formed at an angle with respect to the main portion 32. FIGS. 3A–3B show a generally normal angle. At the other end of the retainer member 30 is a protruded portion 38 which desirably includes one or more sharp edges 39.

FIG. 4 shows a rotational member 40 having a D-shaped cavity 42 formed in a rotational shaft 44. The D-shaped cavity 42 is configured to receive the D-shaped sensor shaft 22 along the direction of insertion 24, desirably forming a press fit or an interference fit therebetween. An interference slot 46 is provided adjacent the cavity 42. In the embodiment shown, the interference slot 46 is disposed adjacent the flat surface of the cavity 42, and extends generally along the direction of insertion 24 of the sensor shaft 22.

Figure 6:
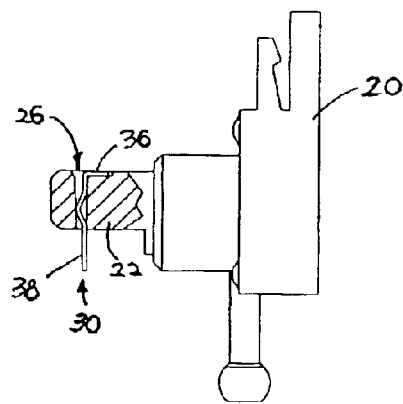
FIG. 6 is a partial cross-sectional view showing assembly of the variable sensor and the retainer member of FIG. 5.

FIGS. 5 and 6 illustrate the assembly of the retainer member 30 and the variable sensor 20. The retainer member 30 is inserted into the retainer slot 26 of the sensor shaft 22. The retainer end portion 36 is disposed in the slot extension 28 along the curved surface of the sensor shaft 22, as seen in FIG. 6. The bump 34 of the retainer member 30 desirably forms an interference contact with the retainer slot 26. The protruded portion 38 of the retainer member 30 protrudes through the flat surface of the sensor shaft 22.

Figure 7:
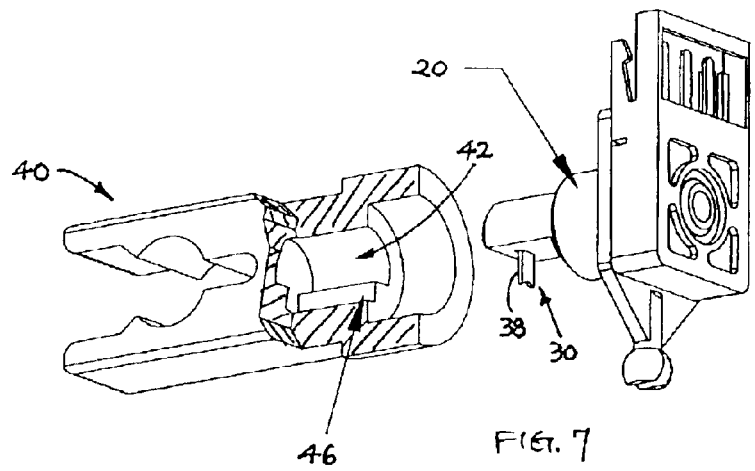
FIG. 7 is an exploded perspective view of the rotational object of FIG. 4 and the assembly of variable sensor and the retainer member of FIG. 6.
Figure 8A:
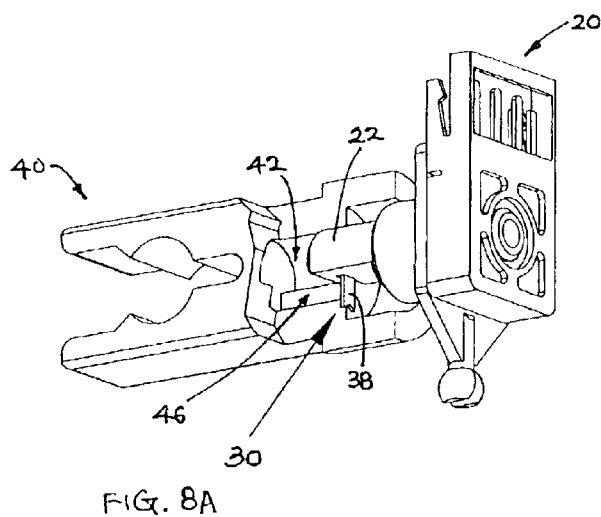
FIG. 8A is a perspective view showing partial insertion of the assembly of the variable sensor and the retainer member into the rotational object of FIG. 7.
Figure 8B:
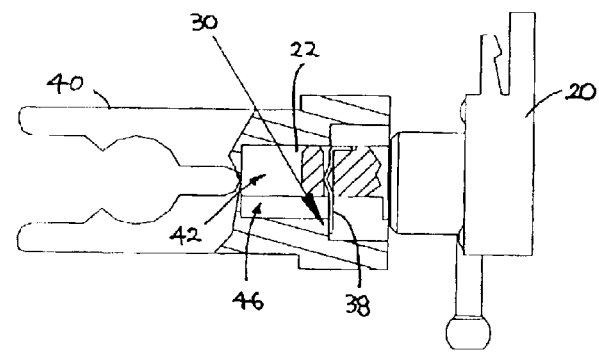
FIG. 8B is a partial cross-sectional view of the assembly of FIG. 8A.
Figure 9A:
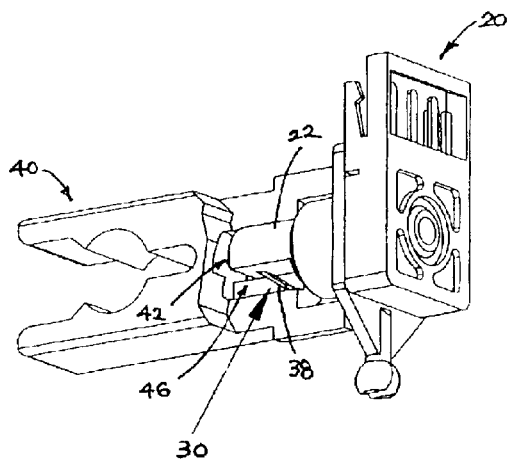
FIG. 9A is a perspective view of an assembled apparatus of the variable sensor, the retainer member, and the rotational object of FIG. 8A.
Figure 9B:
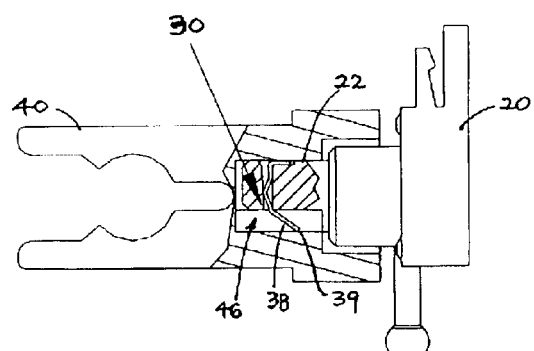
FIG. 9B is a partial cross-sectional view of the assembled apparatus of FIG. 9A.

FIGS. 7–9B illustrate the insertion of the sensor shaft 22 of the rotational sensor 20 and the retainer member 30 into the cavity 42 and interference slot 46 of the rotational member 40. The protruded portion 38 is aligned with the interference slot 46 of the rotational member 40, and is sufficiently large to cause an interference with the interference slot 46, as shown in FIGS. 7–8B. As the sensor shaft 22 is pressed into the cavity 42, the protruded portion 38 is deformed to form an interference contact with the interference slot 46. In the particular embodiment shown in FIGS. 9A and 9B, the protruded portion 38 is bent during insertion of the sensor shaft 22 into the cavity 42. An interference contact is formed between the sharp edges 39 of the protruded portion 38 and the wall of the interference slot 46 of the rotational member 40. The bending of the protruded portion 38 upon insertion applies pressure on the contact point(s) between the retainer member 30 (i.e., sharp edges 39) and the wall of the interference slot 46 to form a secure connection therebetween. If a force is applied to pull the variable sensor 20 away from the rotational member 40, the sharp edges 39 dig into the wall of the interference slot 46, thereby creating a hook effect to prevent detachment or movement of the sensor shaft 22 of the variable sensor 20 away from the cavity 42 of the rotational member 40.

The stiffness and length of the protruded portion 38 of the retainer member 30 can be selected to provide the desired hook effect. If easier removal of the variable sensor 20 from the rotational member 40 is desired, the protruded portion 38 can be made shorter and/or thinner. The reduced stiffness and/or length will allow the protruded portion 38 to buckle more readily when a sufficient force is applied to pull or remove the variable sensor 20 from the rotational member 40. If a spring loading effect is desired to eliminate tolerance without requiring a high tolerance D-shaped cavity 42 and sensor shaft 22, a resilient material and an appropriate thickness can be used for the protruded portion 38. The protruded portion 38 is deformed during insertion of the sensor shaft 22 into the cavity 42 to form a resilient interference contact with the interference slot 46 of the rotational member. In addition, the sensor 20 may be used with the conventional rotational member 10 of FIG. 1 without the retainer member 30 if so desired.

In specific embodiments, the sensor 20 is a direct drive rotational sensor adapted to withstand off-axis loading as disclosed in U.S. patent application Ser. No. 09/273,894, filed Mar. 22, 1999, now U.S. Pat. No. 6,404,417, entitled "Direct Drive Rotational Sensor Adapted to Withstand Off-Axis Loading," which is incorporated herein by reference in its entirety.

The above-described arrangements of apparatus and methods are merely illustrative of applications of the principles of this invention and many other embodiments and modifications may be made without departing from the spirit and scope of the invention as defined in the claims. For instance, different types of sensors can be used for different types of rotational objects. Other configurations of the retainer member can be designed to provide interference contacts with the sensor and the rotational object. The retainer member may be integrally formed with the sensor to include the protruded portion which is deformed during insertion into the cavity of the rotational object to form the interference contact with the interference slot of the rotational member. The scope of the invention should, therefore, be determined not with reference to the above description, but instead should be determined with reference to the appended claims along with their full scope of equivalents.

What is claimed is:

1. A sensor retention apparatus comprising:
   a rotational sensor including a sensor shaft which has a direction of insertion, the sensor shaft including a retainer slot oriented nonparallel to the direction of insertion and extending from a first surface of the sensor shaft through the sensor shaft to a second surface of the sensor shaft;
   a rotational member having a cavity shaped to receive the sensor shaft along the direction of insertion, the rotational member including an interference slot disposed adjacent the cavity; and
   a retainer member configured to be inserted into the retainer slot of the sensor shaft of the rotational sensor and to include a protruded portion protruding from the second surface of the retainer slot into the interference slot of the rotational member, the protruded portion being deformed to form an interference contact with the interference slot of the rotational member.

2. The apparatus of claim 1 wherein the retainer slot is oriented substantially perpendicular to the direction of insertion of the sensor shaft.

3. The apparatus of claim 1 wherein the first surface and the second surface are disposed on opposite sides of the sensor shaft.

4. The apparatus of claim 1 wherein the interference slot of the rotational member extends generally along the direction of insertion of the sensor shaft.

5. The apparatus of claim 1 wherein the protruded portion of the retainer member is bent during insertion of the rotational sensor into the rotational member to form the interference contact with the interference slot of the rotational member.

6. The apparatus of claim 1 wherein the interference contact is formed between a sharp edge of the retainer member and a wall of the interference slot of the rotational member.

7. The apparatus of claim 1 wherein the retainer member comprises a bump disposed in the retainer slot of the sensor shaft to form an interference contact with the retainer slot.

8. The apparatus of claim 1 wherein the retainer member comprises a strip.

9. The apparatus of claim 1 wherein the retainer member comprises a retainer end portion disposed in a slot extension along the first surface of the sensor shaft, the retainer end portion forming an angle with respect to a portion of the retainer member extending through the retainer slot of the sensor shaft.

10. The apparatus of claim 1 wherein the cavity of the rotational member has a D-shaped cross-section having a curved portion and a flat portion, and wherein the interference slot is disposed adjacent the flat portion of the D-shaped cavity.

11. The apparatus of claim 10 wherein the sensor shaft has a D-shaped cross-section having a curved portion and a flat portion, the sensor shaft being configured to form an interference fit with the cavity of the rotational member, and wherein the retainer slot extends from the curved portion to the flat portion of the D-shaped sensor shaft.

12. The apparatus of claim 1 wherein the protruded portion of the retainer member comprises a resilient material which is deformed to form a resilient interference contact with the interference slot of the rotational member.

13. A sensor retention apparatus comprising:
   a rotational sensor including a sensor shaft which extends along a longitudinal axis, the sensor shaft including a retainer slot oriented nonparallel to the longitudinal axis and extending from a first surface of the sensor shaft through the sensor shaft to a second surface of the sensor shaft;
   a rotational member having a cavity shaped to receive the sensor shaft, the rotational member including an interference slot which is disposed adjacent the cavity and extends generally along the longitudinal axis of the sensor shaft received into the cavity; and
   means, disposed in the retainer slot of the sensor shaft and the interference slot of the rotational member, for forming an interference contact with the retainer slot of the sensor shaft and the interference slot of the rotational member.

14. The apparatus of claim 13 wherein the cavity of the rotational member has a D-shaped cross-section having a curved portion and a flat portion, and wherein the interference slot is disposed adjacent the flat portion of the D-shaped cavity.

15. The apparatus of claim 14 wherein the sensor shaft has a D-shaped cross-section having a curved portion and a flat portion, the sensor shaft being configured to form an interference fit with the cavity of the rotational member, and wherein the retainer slot extends from the curved portion to the flat portion of the D-shaped sensor shaft.

16. A sensor retention method comprising:
   providing a rotational sensor including a sensor shaft which has a direction of insertion, the sensor shaft including a retainer slot oriented nonparallel to the direction of insertion and extending from a first surface of the sensor shaft through the sensor shaft to a second surface of the sensor shaft;
   providing a rotational member having a cavity shaped to receive the sensor shaft along the direction of insertion, the rotational member including an interference slot disposed adjacent the cavity;
   inserting a retainer member into the retainer slot of the sensor shaft of the rotational sensor to provide a protruded portion of the retainer member through the second surface of the retainer slot; and inserting the sensor shaft of the rotational sensor into the cavity of the rotational member along the direction of insertion to deform the protruded portion of the retainer member to form an interference contact with the interference slot of the rotational member.

17. The method of claim 16 wherein inserting the retainer member into the retainer slot of the sensor shaft of the rotational sensor comprises forming an interference contact between the retainer member and the retainer slot.

18. The method of claim 16 wherein the protruded portion of the retainer member is deformed to form a resilient interference contact with the interference slot of the rotational member.

19. The method of claim 16 wherein the sensor shaft of the rotational sensor is inserted into the cavity of the rotational member along-the direction of insertion to bend the protruded portion of the retainer member to form an interference contact between an edge of the protruded portion and a wall of the interference slot of the rotational member.

20. The method of claim 16 wherein the sensor shaft of the rotational sensor is inserted into the cavity of the rotational member along the direction of insertion to form an interference fit with the cavity of the rotational member.

21. A sensor retention apparatus comprising:
   a rotational member having a cavity and an interference slot disposed adjacent the cavity; and
   a rotational sensor including a sensor shaft which is shaped to be inserted into the cavity of the rotational member along a direction of insertion, the sensor shaft including a retainer member, the retainer member having a protruded portion protruding from the sensor shaft into the interference slot of the rotational member in a direction which is nonparallel to the direction of insertion, the protruded portion being deformed to form an interference contact with the interference slot of the rotational member.

22. The apparatus of claim 21 wherein the protruded portion of the retainer member is bent in a direction generally opposite from the direction of insertion to form the interference contact with the interference slot of the rotational member.

* * * * *